United States Patent [19]
Siminovitch

[11] Patent Number: 5,717,277
[45] Date of Patent: Feb. 10, 1998

[54] COMPACT FLUORESCENT LAMP USING HORIZONTAL AND VERTICAL INSULATING SEPTUMS AND CONVECTIVE VENTING GEOMETRY

[75] Inventor: Michael Siminovitch, El Sobrante, Calif.

[73] Assignee: The Regents, University of California, Oakland, Calif.

[21] Appl. No.: 55,633

[22] Filed: Apr. 30, 1993

[51] Int. Cl.⁶ .................................................... H01J 5/50
[52] U.S. Cl. ........................ 313/318.02; 313/43; 313/634
[58] Field of Search .................. 313/43, 44, 634, 313/318.01, 318.02; 315/56, 57, 58

[56] References Cited

U.S. PATENT DOCUMENTS

| | | | |
|---|---|---|---|
| 4,363,083 | 12/1982 | Tanaka et al. | 362/216 |
| 4,375,607 | 3/1983 | Morton et al. | 315/56 |
| 4,503,358 | 3/1985 | Kamei et al. | 315/58 |
| 4,694,215 | 9/1987 | Hofmann | 313/44 |
| 4,748,380 | 5/1988 | MacDonald et al. | 315/57 |
| 4,871,944 | 10/1989 | Skwirut et al. | 315/56 |
| 5,086,249 | 2/1992 | Blaisdell et al. | 313/318 |

*Primary Examiner*—Nimeshkumar Patel
*Attorney, Agent, or Firm*—Kathleen DalBon; Paul R. Martin

[57] ABSTRACT

A novel design for a compact fluorescent lamp, including a lamp geometry which will increase light output and efficacy of the lamp in a base down operating position by providing horizontal and vertical insulating septums positioned in the ballast compartment of the lamp to provide a cooler cold-spot. Selective convective venting provides additional cooling of the ballast compartment.

13 Claims, 5 Drawing Sheets

COMPACT FLUORESCENT LAMP USING HORIZONTAL AND VERTICAL INSULATING SEPTUMS AND CONVECTIVE VENTING GEOMETRY

The invention described herein was made with Government support under Contract No. DE-AC03-76SF00098 between the U.S. Department of Energy and the University of California for the operation of Lawrence Berkeley Laboratory. The Government has certain rights in this invention.

FIELD OF THE INVENTION

The present invention relates to an improved compact fluorescent lamp design and more specifically to a lamp using horizontal and vertical insulating septums and convective venting to provide a cooler coldspot environment in a base down burning position.

BACKGROUND OF THE INVENTION

Conventional incandescent light bulbs are less efficient than fluorescent lamps and have significantly shorter lifetimes. For this reason fluorescent lamps are replacing incandescent lights in commercial and residential lighting.

The operating efficiency of compact fluorescent lamps is very sensitive to burning orientation in relation to the position of the base. The base is where the filaments and the ballast and maybe the pins are located and is also the hottest point of the lamp system due to the proximity of the filaments and ballast.

To operate efficiently, compact fluorescent lamps require the maintenance of a particular level of mercury vapor inside the tube during their operating cycle. In a base up or horizontal configuration, a compact fluorescent lamp operates near maximum performance in terms of light output and efficacy. This occurs because excess mercury vapor is able to condense and coalesce at the coolest point on the lamp's surface thereby maintaining an advantageous range of mercury vapor density. This coolspot is located at the lamp tip and is termed the minimum lamp wall temperature (MLWT).

With base down positioning, the compact lamp can loose 10–30% in terms of light output and efficacy due to the lack of an efficient coolspot at the highest density of mercury vapor. In this position, the tip of the lamp is up and the mercury is unable to settle at the tubulation ends due to gravity and the absence of a suitable shelf. Liquid mercury is therefore drawn down to the base where the filaments are located. The higher temperature at the base vaporizes the excess mercury and increases the concentration of mercury vapor in the lamp to disadvantageous levels. The excess mercury vapor results in increased self absorption losses and therefore leads to lower output.

Many residential retrofit applications of the compact fluorescent lamp use a base down positioning, which results in significant losses in performance due to excess mercury vapor. This positioning is necessitated in table lamps because of the screw down orientation originally developed for conventional incandescent light bulbs. Recent experimental work has shown that light output for conventional compact fluorescent lamps can decrease by as much as 10–30% when operated in a base down position.

SUMMARY OF THE INVENTION

The present invention provides for a new geometry for compact fluorescent lamp design, utilizing vertical and horizontal insulating septums positioned at the base of the lamp to provide a cooler cold spot and using selective venting geometries to cool the compartment area surrounding the tubulation end.

It is an object of the present invention to provide an improved compact fluorescent lamp for use in a base down burning position.

It is a further object of the present invention to provide an improved compact fluorescent lamp that will maintain its operating efficiency in base down orientation.

It is a further object of the present invention to provide a design feature that could be easily implemented in the manufacturing of compact fluorescent lamps that will increase lumen output.

It is yet another object of the present invention to provide an inexpensive design feature for compact fluorescent lamps that will increase lumen output in a base down burning position.

These and other objects and features of the invention will become more fully apparent when the following detailed description of the invention is read in conjunction with the accompanying drawing.

DETAILED DESCRIPTION OF THE INVENTION

Figure 1A:
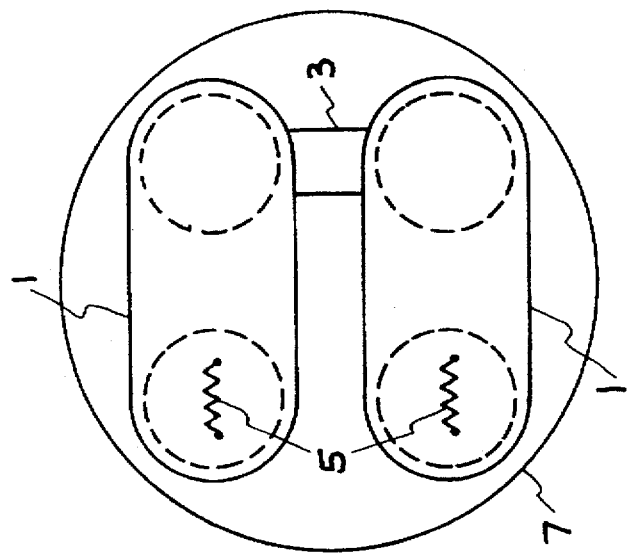
FIG. 1a shows a top down view of a typical quad tube geometry lamp.
Figure 1:
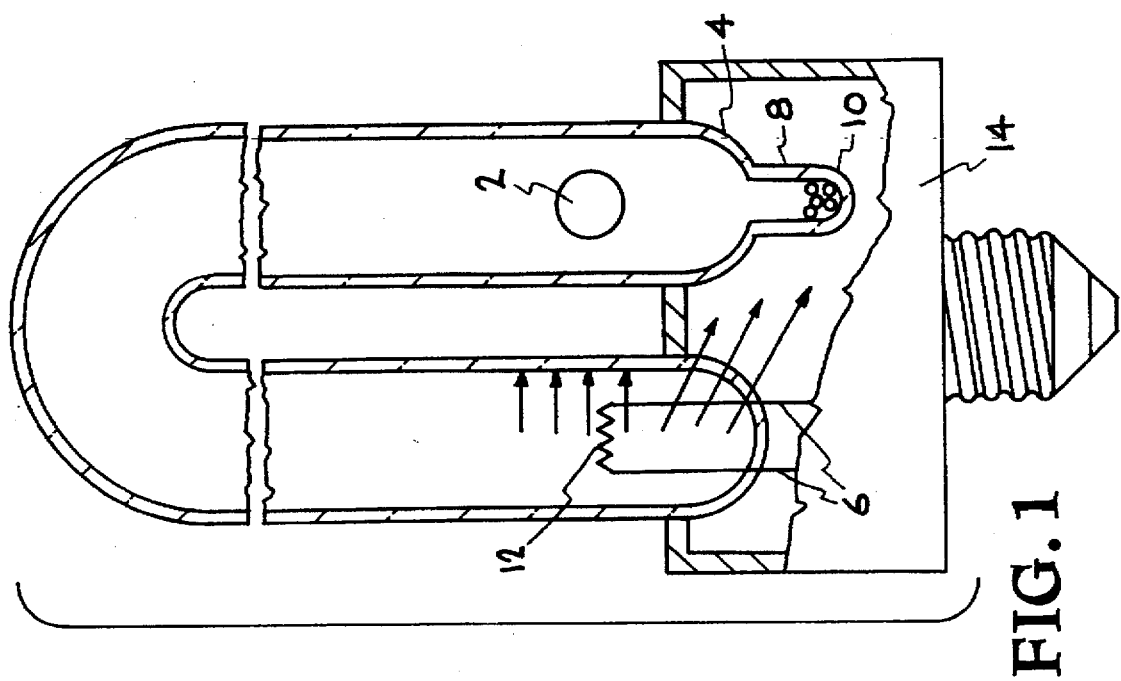
FIG. 1 shows a side view of a typical quad tube geometry lamp, with only two of four tubes displayed.

FIG. 1 illustrates a typical quad tube geometry lamp. The gas bridge 2 of the lamp and the two extensions of the legs (non-filamented legs) 4 are positioned in direct proximity to the filamented ends of the other two legs 6. This direct proximity results in radiant, conductive, and convective heating of the tubulation 8 located on the extension of one of the bridge legs 4.

FIG. 1a also illustrates a typical quad tube geometry lamp. The pairs of tubes 1 are connected by a gas bridge 3. One light tube in each pair is mounted with filaments 5 and the entire assembly is mounted on a ballast housing 7.

Returning to FIG. 1, the tubulation 8 presents a location for mercury condensation and collection due to its horizontal positioning as it is the lowest point with a horizontal surface. Mercury is drawn down to the ends of the lamp 10 by gravity and is then subjected to heating from the filament 12 sides. The tubulation 8 of the lamp is also encapsulated within the ballast compartment of the integral lamp ballast screw-in system 14. This system increases the heating of the mercury because it slows down the radiation of the heat away from the tubulation end. Its proximity to the ballast compartment results in self heating.

Figure 2:
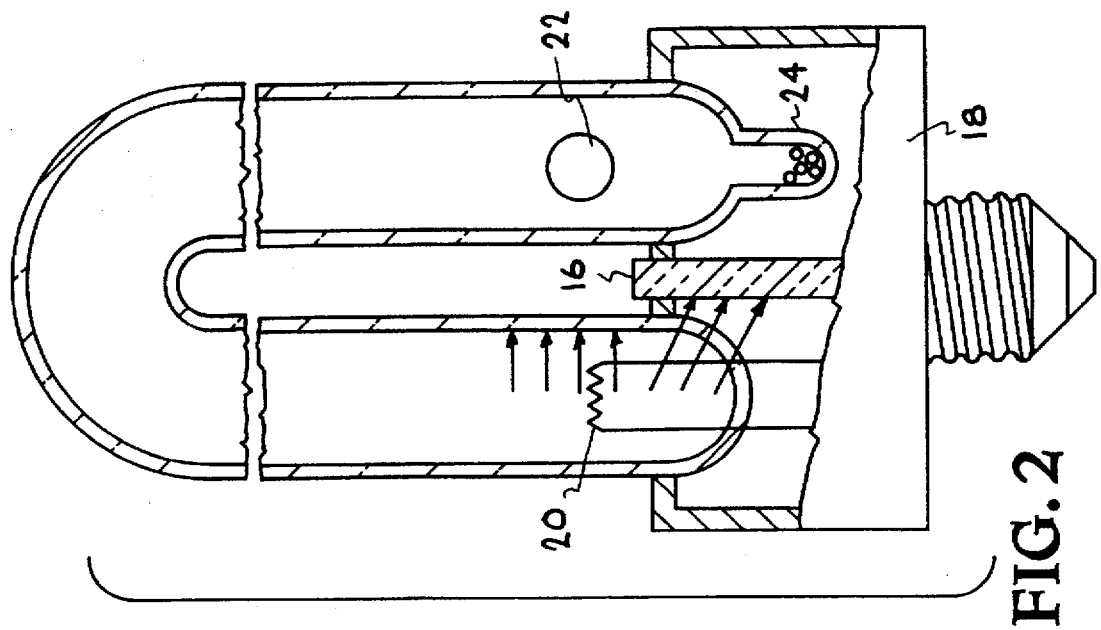
FIG. 2 shows a quad tube geometry lamp employing barriers or septums of the present invention.

FIG. 2 illustrates the present invention in which a barrier or septum 16 is placed between the two sets of legs within the base 18 thereby separating the filament ends 20 within the base from the non filament ends 22. The septum 16 should be manufactured from a thermal insulating material such as carboard or foil backed cardboard. This results in a lower temperature at the tubulation 24. This reduces the amount of excess mercury vapor and thereby increases the lumen output of the lamp.

Figure 3:
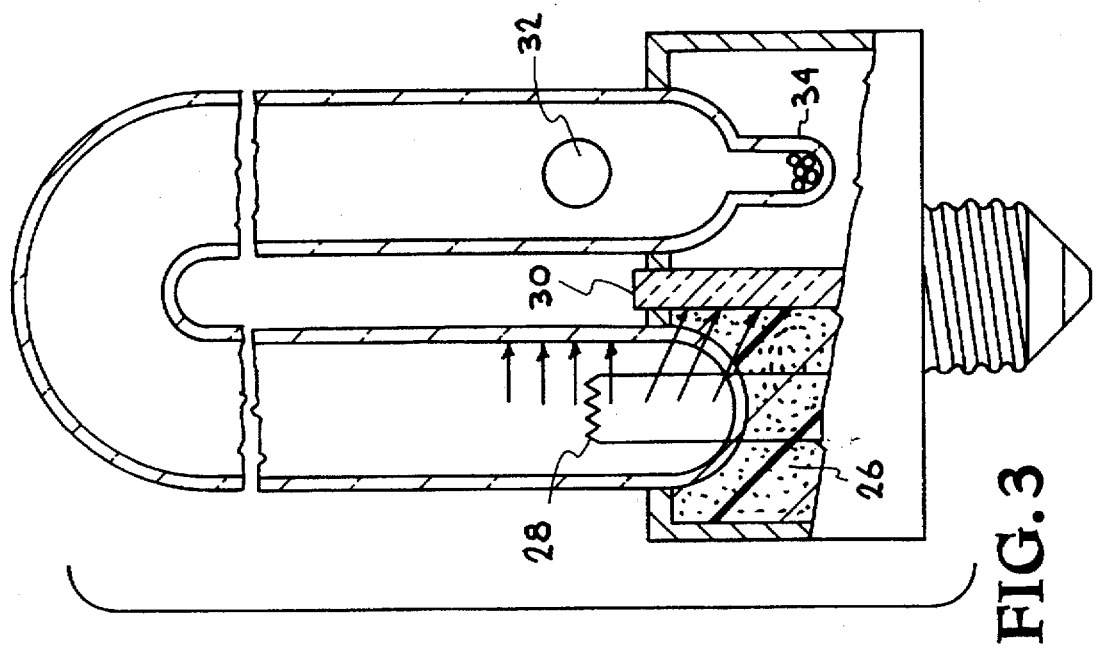
FIG. 3 shows a quad tube geometry lamp employing a barrier or septum of the present invention with conductive foam on the filament side of the barrier or septum.

FIG. 3 illustrates an additional embodiment of the present invention in which an insulating foam material 26 is used in the filament side 28 of the septum 30 to retard the convective and conductive transfer of heat to the non-filament side 32 and the tubulation 34.

Figure 4:
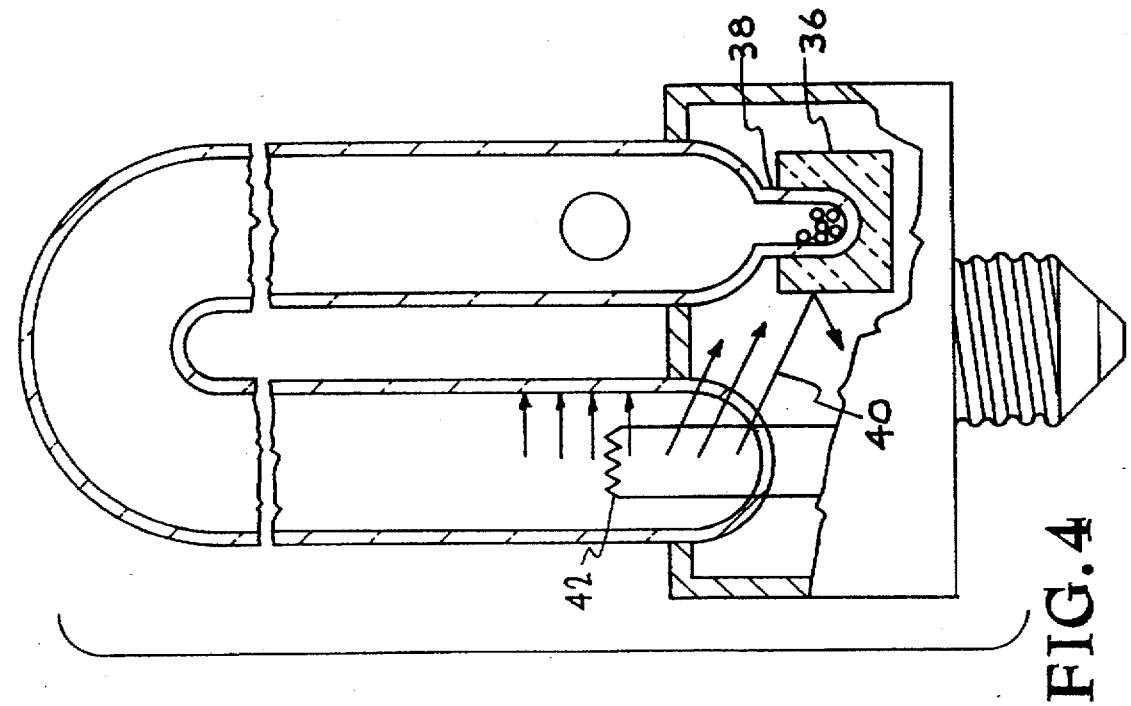
FIG. 4 shows a quad tube geometry lamp employing a barrier or septum of the present invention with an conductive sleeve around the tubulation.

FIG. 4 illustrates an additional embodiment of the present invention in which an conductive sleeve 36 is attached to the tubulation 38. The conductive sleeve 36 would protect the tubulation 38 from the radiant component of the heat 40 transferred from the filaments 42.

Figure 5:
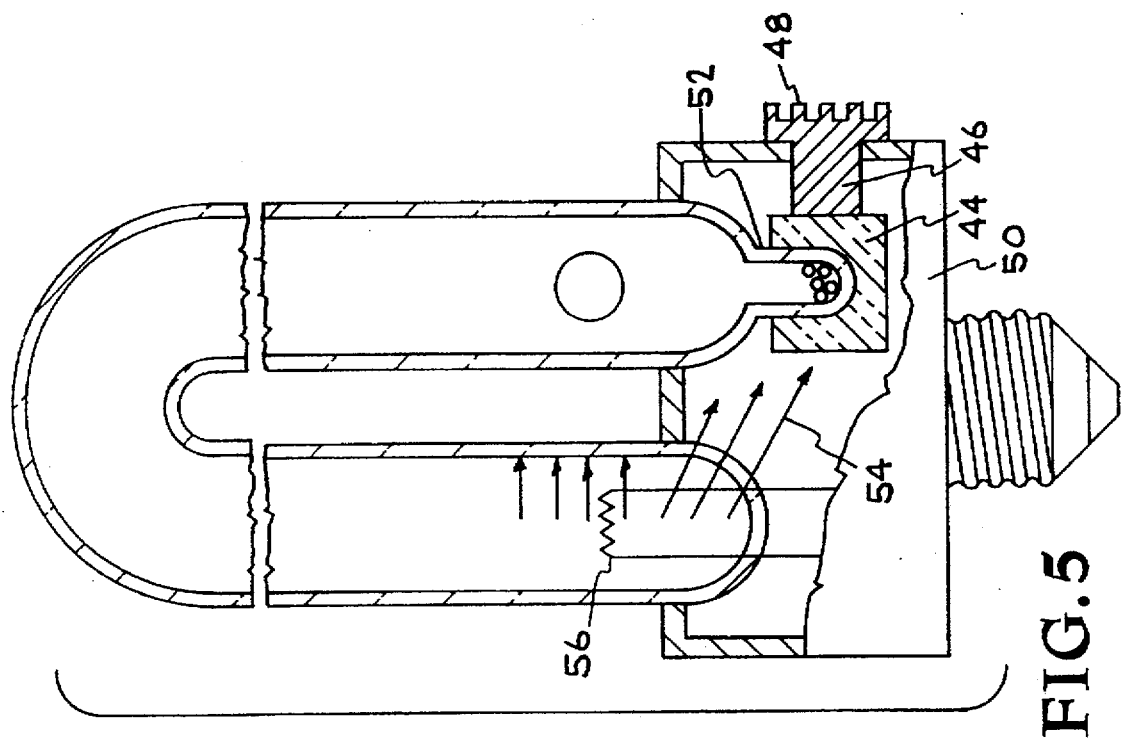
FIG. 5 shows a quad tube geometry lamp employing a barrier or septum of the present invention with an insulating sleeve around the tubulation thermally bridged to a surface mounted exchange.

FIG. 5 illustrates an additional embodiment of the present invention in which a conductive sleeve 44 is connected to a thermal bridge 46 which in turn is connected to a heat exchange 48 mounted on the surface of the base 50. This system would enhance the cooling of the mercury in the tubulation 52 by carrying heat 54 from the filaments 56 away from the tubulation 52. The conductive sleeve 44 can be made of metal.

Figure 6A:
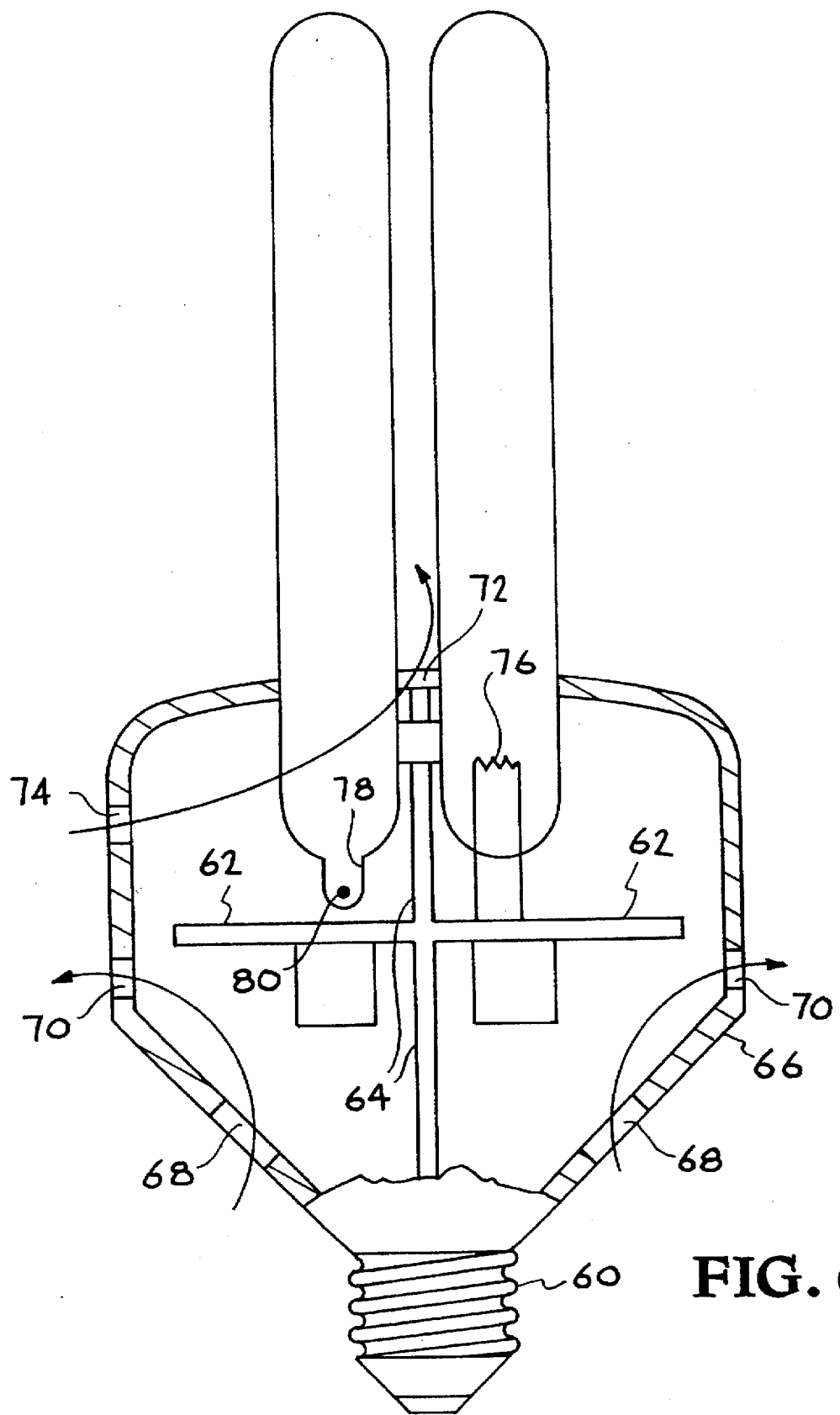
FIG. 6a illustrates a quad tube geometry lamp with a screw in base employing horizontal and vertical septums and convective venting of the ballast compartment.

FIG. 6a illustrates a quad tube geometry lamp with a screw in base 60 employing horizontal septums 62 and vertical septums 64 and convective venting of the lower portion (the area below the horizontal septum) of the ballast compartment 66 through bottom side openings 68 and lower side ballast openings 70. The upper portion (the area above the horizontal septum) of the ballast compartment 66 is convectively ventilated through the top side opening 72 and upper side ballast openings 74. The lamp filaments 76, tubulation 78, and mercury condensation point 80 are illustrated in order to assist in relating FIG. 6a to previously discussed illustrations. The horizontal and vertical septums can be a single piece mounted inside the ballast housing. The septums can be an integral part of the ballast housing or they can be separate elements from the ballast housing. The vertical septum may extend beyond the top of the ballast housing between the lighting tubes.

Figure 6B:
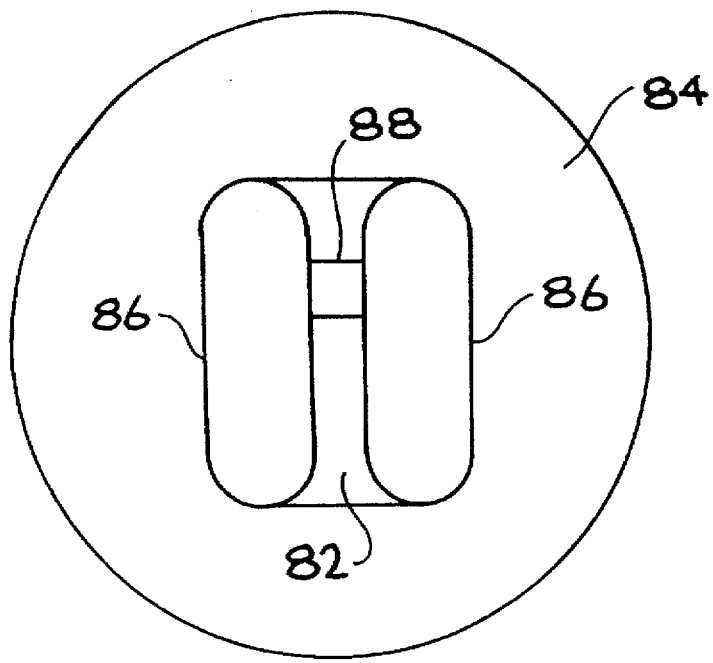
FIG. 6b illustrates a top view of a quad tube geometry lamp and shows where a ventilation opening is created at the top of the ballast housing between the light tubes.

FIG. 6b illustrates a top view of a quad tube geometry lamp and shows where a top side ventilation opening 82 is created at the top of the ballast housing 84 between the light tubes 86. This figure also illustrates the gas bridge 88 discussed in previous illustrations.

Figure 6C:
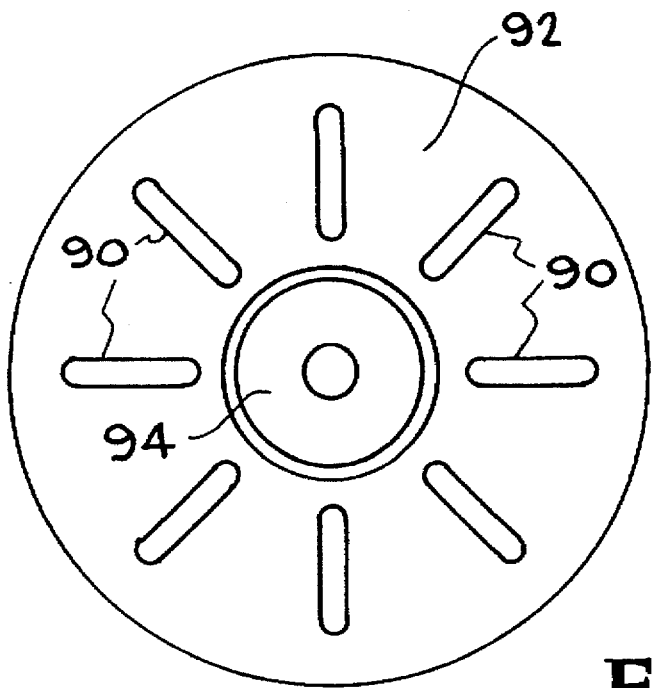
FIG. 6c illustrates a bottom view of a quad tube geometry lamp and shows where ventilation openings are placed around the bottom side of the ballast compartment.

FIG. 6c illustrates a bottom view of a quad tube geometry lamp and shows where ventilation openings 90 are placed around the bottom side of the ballast housing 92. The openings are illustrated being distributed radially around a screw in base 94.

It will be recognized by those skilled in the art that this description may not be the only possible description of the present invention. The different embodiments of the present invention can be used individually or in combination. They have been illustrated separately solely for the sake of clarity.

We claim:

1. An improved compact fluorescent lamp with reduced sensitivity to base down burning orientations comprising:
   a) a ballast housing,
   b) U-shaped lighting tubes mounted into said ballast housing,
   c) a plurality of filaments mounted at the base of one or more but not all of said tubes,
   d) a tubulation located at the base of one or more of said lighting tubes which have not been mounted with filaments,
   e) a means for connecting the filaments in said lighting tubes to an external power source,
   f) horizontal and vertical insulating septum or septums made from a material which includes a thermally insulating material positioned inside the ballast housing separating one or more of said filament containing tubes from one or more of said non-filament containing tubes.

2. The invention as recited in claim 1, wherein said lighting tubes are arranged in a quad tube geometry.

3. The invention as recited in claim 1, wherein said means for connecting the filaments in the light tubes to an external power source is additionally comprised of a screw in base.

4. The invention as recited in claim 1, wherein said means for connecting the filaments in the light tubes to an external power source is a pin style connector.

5. The invention as recited in claim 1, wherein said septum extends beyond the top of said ballast housing between said lighting tubes.

6. The invention as recited in claim 1, wherein said horizontal and vertical septums are a single piece mounted inside said ballast housing.

7. The invention as recited in claim 1, wherein said septum or septums are an integral part of said ballast housing.

8. The invention as recited in claim 1, wherein said septum or septums are separate elements from said ballast housing.

9. The invention as recited in claim 1, wherein an insulating foam is placed in a filament containing side of said septum inside said base.

10. The invention as recited in claim 1, wherein a conductive sleeve is placed around said tubulation.

11. The invention as recited in claim 10, wherein said conductive sleeve is made of metal.

12. The invention as recited in claim 11, wherein said conductive sleeve is thermally bridged to a heat exchange mounted on the surface of said ballast housing.

13. The invention as recited in claim 1, wherein a plurality of ventilation openings are provided which are equally distributed around the bottom and side of said ballast housing below the level of said horizontal insulating septum.

* * * * *